US010284076B2

(12) United States Patent
Chen et al.

(10) Patent No.: US 10,284,076 B2
(45) Date of Patent: May 7, 2019

(54) CONVERTER MODULE FOR HVDC POWER STATION

(71) Applicant: ABB SCHWEIZ AG, Baden (CH)

(72) Inventors: Nan Chen, Västerås (SE); Sari Laihonen, Västerås (SE); Ludvig De Laval, Stockholm (SE); Erik Doré, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/070,479

(22) PCT Filed: Feb. 12, 2016

(86) PCT No.: PCT/EP2016/052959
§ 371 (c)(1),
(2) Date: Jul. 16, 2018

(87) PCT Pub. No.: WO2017/137088
PCT Pub. Date: Aug. 17, 2017

(65) Prior Publication Data
US 2019/0028020 A1 Jan. 24, 2019

(51) Int. Cl.
H02M 7/757 (2006.01)
H02M 1/32 (2007.01)
(Continued)

(52) U.S. Cl.
CPC ............ H02M 1/32 (2013.01); H02H 7/1225 (2013.01); H02M 5/4585 (2013.01); H02M 2001/325 (2013.01); H02M 2007/4835 (2013.01)

(58) Field of Classification Search
CPC ................ H02M 7/7575; H02M 1/32; H02M 2001/325; H02M 5/4585; H02J 3/36; H02H 7/268; H02H 7/261; H02H 7/262
(Continued)

(56) References Cited

U.S. PATENT DOCUMENTS 9,651,603 B2 *  5/2017  Schweizer ............ H02M 1/088
2010/0034001 A1   2/2010  Dommaschk et al.
(Continued)

FOREIGN PATENT DOCUMENTS

| CN | 103915808 A | 7/2014 |
| EP | 2 980 981 A1 | 2/2016 |
| JP | 2015115975 A * | 6/2015 |

OTHER PUBLICATIONS

International Preliminary Report on Patentability, issued in PCT/EP2016/052959, dated Feb. 15, 2018.
(Continued)

Primary Examiner — Alex Torres-Rivera
(74) Attorney, Agent, or Firm — Birch, Stewart, Kolasch & Birch, LLP

(57) ABSTRACT

A converter module for power converter stations includes a first terminal for input/output of an electrical current to the converter module via a first connection line, a second terminal for output/input of the current from the converter module via a second connection line, and a by-pass switch connected between the first terminal and the second terminal. The converter module further includes a first switching module and a second switching module connected in series via a first node connected to either one of the first terminal and the second terminal and at least two capacitor units. The first switching module includes two switching devices and the second switching module is connected between the first node and a second node. In the converter module, a first capacitor unit is connected from the second node to a first switching device of the first switching module and a second capacitor unit is connected from the second node to a second switching device of the first switching module to form two separate current paths between the first node and the second node. Accordingly, a reduction of the energy discharge is obtained upon failure of one or more of the switching devices or modules.

20 Claims, 4 Drawing Sheets

(51) Int. Cl.
 *H02H 7/122* (2006.01)
 *H02M 5/458* (2006.01)
 *H02M 7/483* (2007.01)

(58) Field of Classification Search
 USPC .......................................................... 363/35
 See application file for complete search history.

(56) References Cited

U.S. PATENT DOCUMENTS

| | | | |
|---|---|---|---|
| 2013/0314956 A1* | 11/2013 | Tang | H02M 7/003 |
| | | | 363/54 |
| 2014/0226374 A1* | 8/2014 | Hafneer | H02M 1/32 |
| | | | 363/35 |
| 2014/0313797 A1* | 10/2014 | Davidson | H02M 7/49 |
| | | | 363/50 |
| 2015/0171733 A1 | 6/2015 | Zargari et al. | |
| 2016/0072267 A1 | 3/2016 | Fu et al. | |
| 2017/0012521 A1* | 1/2017 | Jimichi | H02M 7/483 |
| 2017/0126127 A1* | 5/2017 | Koyanagi | H02M 1/32 |
| 2017/0201094 A1* | 7/2017 | Hassan | H02J 3/36 |
| 2017/0214312 A1* | 7/2017 | Schmitt | H01F 27/40 |
| 2018/0166994 A1* | 6/2018 | Dorn | H02H 9/04 |

OTHER PUBLICATIONS

International Search Report, issued in PCT/EP2016/052959, dated Jun. 21, 2016.
Written Opinion of the International Searching Authority, issued in PCT/EP2016/052959, dated Jun. 21, 2016.

\* cited by examiner

CONVERTER MODULE FOR HVDC POWER STATION

TECHNICAL FIELD

The present disclosure relates to the field of converter modules. In particular, the present disclosure relates to the field of converter modules for high voltage direct current (HVDC) power station.

TECHNICAL BACKGROUND

Power converter stations may comprise a valve unit formed of a stack (or column) of power converter modules. The converter modules may be connected in series. In a power converter module, transistors (or switches), such as insulated-gate bipolar transistors (IGBT), are typically associated with a capacitor adapted as energy storage component for the converter module.

The valve unit may also include a by-pass switch which, if a failure is detected at a converter module (such as for instance at one of the transistors of the converter module), provides another current path. In other words, when a failure is detected at a converter module, a control unit may cause the converter module to be by-passed (short-circuited). When the by-pass switch has been triggered, the energy stored in the capacitor of the converter module is totally discharged through the (closed or activated) by-pass switch or the failed transistor, which may create a very high current peak (in the range of for example hundreds of kilo amperes).

At the same time, the energy storage used in design of power converter modules tends to increase which in turn tends to increase the level of the current peak upon failure (at discharge). Fault handling related to increasing energy storage in power converter module design is one of the major challenges for future HVDC power stations.

SUMMARY

An object of the present disclosure is therefore to at least partially overcome the challenge mentioned above.

This and other objects are achieved by means of a converter module as defined in the appended independent claim. Other embodiments are defined by the dependent claims.

As mentioned above, the high current and energy discharge occurring during by-pass switch operation is a challenge in the design of power converter modules due to the high electromagnetic fields and forces involved during the discharge. It would therefore be beneficial to provide a solution which can reduce the energy discharged during such operation.

The present disclosure relates to embodiments in which the amount of energy being discharged upon failure of a transistor (or switching device) of the converter module is reduced.

In some embodiments, the converter module includes at least two switching modules connected in series and one of the two switching modules includes at least two switching devices. Further, the power converter may include at least two capacitor units such that each of the two switching devices is electrically connected to one of the capacitor units. In other words, instead of using one capacitor for storing energy to be provided to the switching devices of the converter module, the capacitor or energy storage of the converter module may include at least two capacitor units. Embodiments with more than two capacitor units may be envisaged.

Upon failure of one of the switching modules (or upon failure of one of the switching devices of the switching modules), a by-pass switch of the power converter may be activated (or triggered) such that the converter module will be by passed by the by-pass switch. Consequently the energy stored in the capacitor unit electrically connected to the failed switching device will be discharged.

In these embodiments, a first current path is provided for discharge of a first capacitor unit electrically connected to a first switching device upon failure of such first switching device and a second separate current path is provided for discharge of a second capacitor unit electrically connected to a second switching device upon failure of such second switching device. As a result, the amount of energy to be discharged via the by-pass switch in case of failure is reduced since only the energy stored in the capacitor unit electrically connected to (or dedicated to) the failed switching device is discharged. The amount of energy to be discharged may be proportional to the number of capacitor units used to form the converter module together with the switching devices.

In an example in which two capacitor units separately connected to two switching devices are used to form one of the switching modules of the power converter module, the discharge energy will be reduced by a factor of two, and the current peak may be reduced as a result. However, the converter module may be designed with more than two capacitor units and thus more than two current paths to discharge the energy stored to supply the transistors under operation. In these cases, the energy discharge may be further reduced by a factor greater than two, depending on the design.

The embodiments of the present disclosure may alleviate at least some of the constraints on the by-pass switch that may be used in such HVDC power converter applications. For example, by limiting the current peak (i.e. reducing the energy discharge), a bypass switch that is smaller and cheaper to design and manufacture may be used.

The embodiments of the present disclosure provide also for higher current rating for the converter module (or converter cell) and an improved scalability of converter module design for different power rating requirements.

The embodiments of the present disclosure may use either a half bridge topology or full-bridge topology for the arrangement of the transistors (or switching modules/devices) forming the converter module (or converter cell).

In general, a converter module may include at least two switching modules connected in series via a node.

In the present embodiments, the converter module may be equipped with a number of capacitor units to supply current to these switching modules and a number of independent current paths are provided for discharge of the capacitor units via a by-pass switch upon failure of any of transistors (or switches) of the switching modules.

The converter module may include a first terminal for input of an (alternating) electrical current via a first connection line and a second terminal for output of the (alternating) electrical current via a second connection line. It will be appreciated that the first and second terminals may be interchangeable such that the second terminal may be used for input of the current to the converter module and the first terminal may be used for output of the current to the converter module. The principle remains the same.

Further, the converter module may include a by-pass switch connected between the first terminal and the second terminal.

According to one embodiment, the converter module includes a first switching module and a second switching module connected in series via a first node connected to either one of the first terminal and the second terminal. At least the first switching module may include two switching devices and the second switching module may be connected between the first node and a second node. The converter module may also include at least two capacitor units, wherein a first capacitor unit is connected from the second node to a first switching device of the first switching module and a second capacitor unit is connected from the second node to a second switching device of the first switching module to form two separate current paths between the first node and the second node.

According to some embodiments, the first switching module may include a plurality of switching devices and the converter module may comprise a plurality of capacitor units. Each of the capacitor units may be separately connected to one of the switching devices of the first switching module.

According to some embodiments, a switching device of the first switching module may include a transistor having an emitter, a gate and a collector. In a particular embodiment, the second switching module may be connected at the second node to either the emitters or the collectors of the switching devices of the first switching module.

According to some embodiments, the gates of the switching devices of the first switching module are connected to a common control line or to separate control lines.

According to some embodiments, the second switching module may include one or more switching device.

In the above, a switching device (of the first or second switching module) may be one of an insulated-gate bipolar transistor (IGBT), a bi-mode insulated gate transistor (BIGT), a metal-oxide-semiconductor field-effect transistor (MOSFET), an integrated gate-commutated thyristor (IGCT), a gate turn-off thyristor (GTO), a high electron mobility transistor (HEMT) and a hetero junction bipolar transistor (HBT).

In some embodiments, the converter module may further comprise at least one resistive component. A first current path connecting the first capacitor unit to the first switching device of the first switching module may then be connected to a second current path connecting the second capacitor unit to the second switching device of the first switching module via such a resistive component. By way of examples, the resistive component may be a resistor, a surge arrestor, an inductor with a resistor, or the like.

In an embodiment, the resistive component may include at least two separate resistor elements (or resistive elements) connected in series at a node connected to the second node through at least a semiconductor switch or a mechanical switch.

According to some embodiments, the by-pass switch may be connected in parallel with the second switching module between the first node and the second node. In other words, the second terminal may be connected to the second node. Such a connection of the by-pass switch is suitable for a half-bridge topology design.

In other embodiments, however, a full-bridge topology design may be used. Accordingly, the converter module may further comprise a third switching module and a fourth switching module connected in series via a third node. The third switching module may include at least two switching devices and the fourth switching module may be connected between the second node and the third node. In these embodiments, a first switching device of the third switching module is connected to the second node via the first capacitor unit and a second switching device of the third switching module is connected to the first node via the second capacitor unit to form two separate (or independent) current paths between the third node and the second node.

In converter modules based on the full-bridge topology, the by-pass switch may be connected between the first node and the third node.

According to some embodiments, a device comprising a control circuit and at least one converter module as defined in any one of the preceding embodiments is provided. Upon detection of a failure at any one of the switching devices of the first switching module or the third switching module and/or upon detection of a failure at any of the second switching module or the fourth switching module, the control circuit may be configured to generate a signal (e.g. a control signal which may be an electrical signal) instructing at least one of (or all of) the switching devices of the converter module to turn off.

In some embodiments, the control circuit may be further configured to instruct the by-pass switch to conduct current upon detection of the failure (for discharge of energy of the capacitor unit connected to the switching device at which the failure has been detected).

Advantageously, the control circuit may be configured to trigger the by-pass switch after a delay has elapsed since transmission of instructions to turn off (or deactivate) the switching devices of the converter module.

Generally, the control circuit may be configured to synchronize activation and deactivation of the switching devices of the converter module.

According to an embodiment, a power converter station comprising a plurality of converter modules or devices as defined any one of the preceding embodiments is provided. The plurality of converter modules may be connected in series and arranged as at least one column.

The present disclosure also relates to all possible combinations of features mentioned herein. Any embodiment described herein may be combinable with other embodiments also described herein, and the present disclosure relates to all combinations of features.

BRIEF DESCRIPTION OF THE DRAWINGS

The above, as well as additional objects, features and advantages of the inventive current transducer, will be better understood through the following illustrative and non-limiting detailed description of preferred embodiments. Reference is made to the appended drawings, in which.

Figure 1:
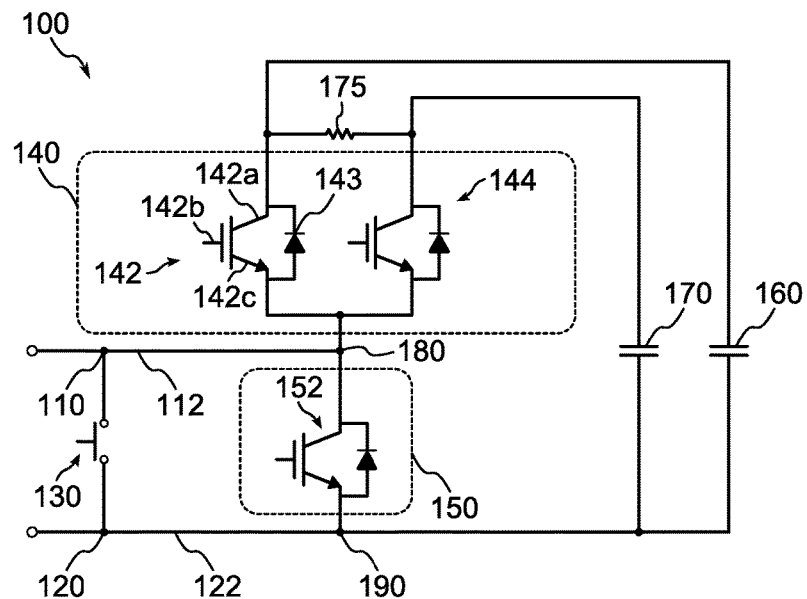
FIG. 1 shows a circuit diagram of a converter module according to one embodiment based on a half-bridge topology.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

With reference to FIG. 1, an embodiment of a power converter module (or converter cell) is described.

FIG. 1 shows a circuit diagram illustrating the electrical arrangement of elements of a converter module 100 based on a half-bridge cell topology.

The converter module 100 includes a first terminal 110 for input/output of an electrical (alternating) current to the converter module via a first connection line 112 and a second terminal 120 for output/input of the electrical (alternating) current from the converter module via a second connection line 122. It will be appreciated that the first and second terminals are arranged to provide input/output of a signal comprising both an AC component and a DC component.

A by-pass switch 130 is connected between the first terminal 110 and the second terminal 120 such that, upon failure at the converter module, the by-pass switch may be activated (i.e. closed) and the current may be redirected to pass (or flow) through the by-pass switch.

The converter module 100 further includes a first switching module 140 and a second switching module 150 connected in series via a first node 180. In the present example, the first node 180 is connected to the first terminal 110. The first terminal 110 and the first node may therefore be considered to be at the same electrical potential level. The first switching module 140 includes two switching devices 142, 144 and the second switching module 150 is connected between the first node 180 and a second node 190.

In the example shown in FIG. 1, the first switching module includes two switching devices (or transistors) 142, 144 connected in parallel from the first node 180 and the second switching module 150 includes only one switching device (or transistor) 152. However, in some other embodiments, the second switching module 150 may include more than one switching device. Further, the first and second switching modules may not only include a transistor but for instance also a diode.

The converter module 100 includes also two capacitor units 160, 170. Advantageously, the two capacitor units may have the same voltage value (or at least similar capacitance values).

In the converter module, the first capacitor unit 160 is connected from the second node 190 to the first switching device 142 of the first switching module 140 and the second capacitor unit 170 is connected from the second node 190 to the second switching device 144 of the first switching module 140 to form two separate current paths between the first node 180 and the second node 190.

Expressed differently, from the first node 180 to the second node 190, a first electrical current path, along which the first switching device 142 and the first capacitor unit 160 are connected in series, is electrically arranged in parallel with a second electrical current path along which the second switching device 144 and the second capacitor unit 170 are connected in series.

As mentioned above, upon failure of e.g. one of the transistors of the converter module 100, instead of a total discharge of the whole energy storage allocated to (or provided for) this converter module (as would be determined by both the capacitance of the first capacitor unit and the capacitance of the second capacitor unit), only one of the two capacitor units will be discharged via the by-pass switch 130. The converter module of the present embodiment reduces the energy discharge upon failure of one of the switching devices of the converter module.

By way of examples, the transistors (or switching devices) of the first and second switching modules may be insulated-gate bipolar transistors (IGBTs), bi-mode insulated gate transistors (BIGTs), metal-oxide-semiconductor field-effect transistor (MOSFETs), integrated gate-commutated thyristor (IGCTs), gate turn-off thyristors (GTOs), high electron mobility transistors (HEMTs) or hetero junction bipolar transistors (HBTs). The embodiments of the present disclosure are not limited to these examples. Further, the types of semiconductor materials used for the transistors may be silicon, silicon carbide, Gallium Nitride or Gallium Arsenide.

As depicted in FIG. 1, the switching device 142 of the first switching module 140 may include a transistor having an emitter 142a, a gate 142b and a collector 142c.

As mentioned above, the switching devices 142 and 144 of the first switching module 140 may for example be BIGTs or IGBTs. An IGBT 142 may comprise two semiconductor chips in the form of a transistor 142 and a diode 143 connected in parallel to the transistor 142, and a BIGT may be a single-chip component adapted to replace a two-chip IGBT, e.g. by integrating the functionality of the IGBT in a single semiconductor chip.

A switching device, in the form of a BIGT or IGBT, is illustrated in the circuit diagram in FIG. 1 by a transistor 142 and a diode 143 electrically connected in parallel to the transistor 142, the diode 143 having a direction of conductance from an emitter 142c of the transistor 142 to a collector 142a of the transistor 142. Similarly the second switching device 144 of the first switching module 140 is illustrated by an IGBT or BIGT with a transistor and a diode electrically connected in parallel to the transistor, the diode having a direction of conductance from an emitter of the transistor to a collector of the transistor.

More specifically, in the converter module 100 according to the embodiment shown in FIG. 1, a first electrode of the capacitor unit 160 is connected to the collector 142a of the transistor 142 and a second electrode of the capacitor unit 160 is connected to the second node 190. In its turn, the second node 190 is connected to an emitter of the transistor 152 of the second switching module 150. In other words, one electrode of the first capacitor unit 160 is connected to the collector 142a of one of the two transistors of the first switching module 160 while its other electrode is connected to the emitter of the transistor 152 of the second switching module 170.

Similarly, a first electrode of the second capacitor unit 170 is connected to the collector of the second transistor (or second switching device) 144 while its second electrode is connected to the second node 190, i.e. the emitter of the transistor 152 of the second switching module 150.

In the present embodiment, the second switching module 150 is connected at the first node 180 to the emitters of the switching devices of the first switching module 140.

Although the second switching module is shown to include only one switching device (or transistor) in the present embodiment, other embodiments wherein the second switching module includes more than one switching device may be envisaged.

Optionally, the converter module 100 may further comprise at least one resistive component or resistor (or a resistor further in series with an inductor) 175 which serves to connect a first electrical current path established between the first capacitor unit 160 and the first switching device 142 of the first switching module 140 to a second electrical current path established between the second capacitor unit 170 and the second switching device 144 of the first switching module 140. The first electrical current path referred to herein is the current path connecting the first capacitor unit 160 to the (collector 142c of the) first switching device 142 of the first switching module while the second electrical current path referred to herein is the current path connecting the second capacitor unit to the (collector of the) second switching device 144 of the first switching module 140.

Further, in the present embodiment, the by-pass switch 130 is connected in parallel with the second switching module 150 between the first node 180 and the second node 190. As mentioned above, in the present case, it may also be considered that the by-pass switch 130 is connected between the first connection line 112 and the second connection line 122.

As explained above, upon detection of a failure of one of the switching devices 142, 144 of the first switching module 140, only the capacitor unit dedicated to supply energy to the failed switching device will be discharged via the by-pass switch 130.

The present embodiment may be implemented by providing a piecewise capacitor surrounding the switching devices. Each of the pieces of the capacitor may represent one of the capacitor units and provide energy storage to some of the switching devices of the converter module.

The capacitor units may for example be arranged (assembled) in a ring to form an annular capacitor within which the switching devices may be placed. Using ring-shaped converter modules with a piecewise annular capacitor body provides the advantage of evenly distributed parasitic circuit components.

Although it is shown that one capacitor unit is connected to one switching device (or transistor) of the switching module 140, in other embodiments, one of the capacitor units may be connected to supply energy to more than one switching devices.

Figure 2:
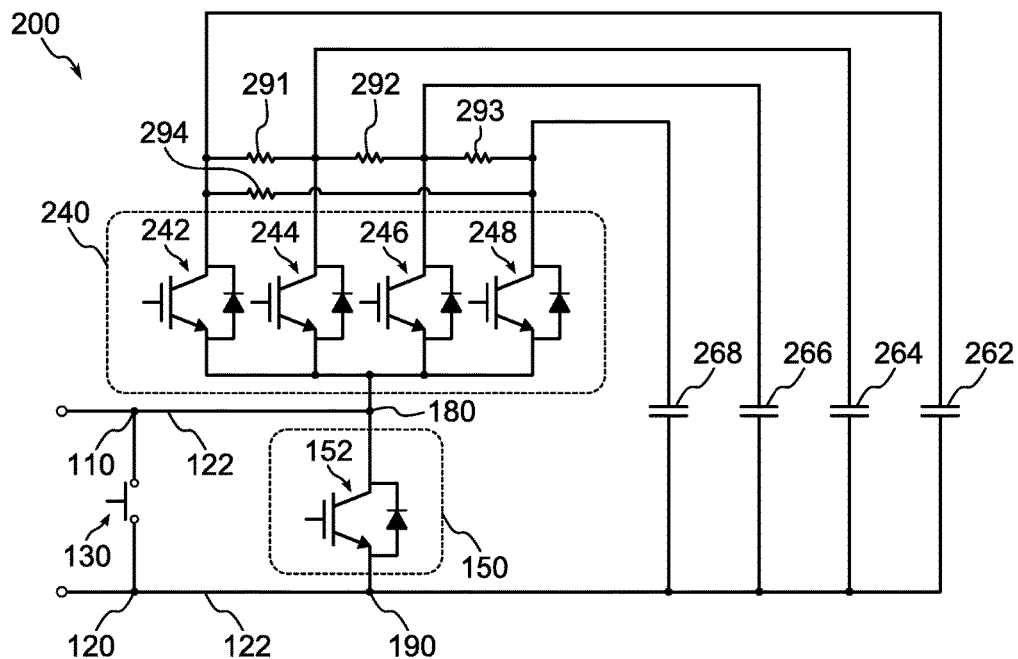
FIG. 2 shows a circuit diagram of a converter module according to another embodiment including more than two capacitor units.

With reference to FIG. 2, a power converter module (or converter cell) according to another embodiment is described.

FIG. 2 shows a circuit diagram illustrating the electrical arrangement of elements of a converter module 200 based on a half-bridge cell topology.

The converter module 200 shown in FIG. 2 is equivalent to the converter module 100 described with reference to FIG. 1 except that the first switching module 240 includes more than two switching devices, namely four switching devices 242, 244, 246 and 248 in the present example, and the converter module 200 comprises also more than two capacitor units, namely capacitor units 262, 264, 266 and 268 in the present example. Each of the capacitor units 262, 264, 266 and 268 is separately connected to one of the switching devices 242, 244, 246 and 248, respectively, of the first switching module 240.

The present embodiment may be implemented using a piecewise capacitor comprising four pieces. As mentioned with regard to FIG. 1, each of the four pieces may correspond to one of the capacitor units and the pieces may be assembled to form an annular capacitor body within which the switching devices are arranged, thereby resulting a ring-shaped converter module (or converter cell).

In this case, the energy discharge upon failure of one of the switching devices may be reduced by a factor 4. In general, the converter module may comprise a number N of capacitor units which may be connected to a number N of switching devices, or a number N of groups of switching devices (if one capacitor unit is connected to more than one switching device) or combination thereof (should one capacitor unit be connected to one switching device and another capacitor unit be connected to more than one switching devices).

FIG. 2 also illustrates that a first electrical current path established between a first capacitor unit 262 and a first switching device 242 of the first switching module 240 may be connected via a first resistor 291 to second electrical current path established between a second capacitor unit 264 and a second switching device 244 of the first switching device 240. Similarly, a third electrical current path established between a third capacitor unit 266 and a third switching device 246 of the first switching module 240 may be connected via a second resistor 292 to the second electrical current path and a fourth electrical current path established between a fourth capacitor unit 268 and a fourth switching device 248 of the first switching device 240 may be connected via a third resistor 293 to the third electrical current path.

In some embodiments, an additional resistor 294 may be connected between the first electrical current path and the second electrical current path for balancing voltage between the capacitor units.

Figure 3:
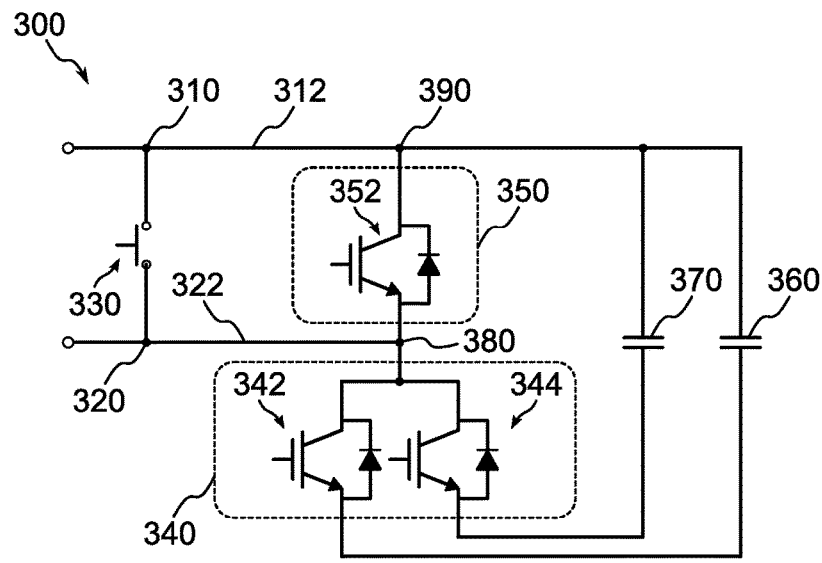
FIG. 3 shows a circuit diagram of a converter module according to yet another embodiment.

With reference to FIG. 3, a power converter module (or converter cell) according to yet another embodiment is described.

FIG. 3 shows a circuit diagram illustrating the electrical arrangement of elements of a converter module 300 based on a half-bridge cell topology.

The converter module 300 shown in FIG. 3 is equivalent to the converter module 100 described with reference to FIG. 1 except that, instead of having the emitters of the switching devices (or transistors) of the first switching module being connected to the second switching module, the collectors of the switching devices (or transistors) of the first switching module are connected to the second switching module (i.e. the first node 380).

In this embodiment, the power converter module 300 includes a first switching module 340, a second switching module 350 and two capacitor units 360, 370 generally connected as described with reference to FIG. 1 (see first switching module 110, second switching module 120 and two capacitor units 160, 170) except for the above mentioned difference.

Similarly, the first node 180, the second node 190, the first switching device 142, the second switching device 144, the first terminal 110, the first connection line 112, the second terminal 120 and the second connection line 122 of the embodiment described with reference to FIG. 1 corresponds to the first node 380, the second node 390, the first switching device 342, the second switching device 344, the first terminal 310, the first connection line 312, the second terminal 320 and the second connection line 322 of the converter module 300 shown in FIG. 3. As mentioned above, the only difference is that the transistors 142 and 144 of the first switching module are connected in an opposite direction on an electrical conduction point of view.

The present embodiment shown in FIG. 3 may also be described in relation to the embodiment described with reference to FIG. 1 in that, instead of the upper switching module of the converter module, it is the lower switching module 340 of the converter module that includes two switching devices 342, 344 connected independently (separately) to the two capacitor units 360, 370. In this case, however, the by-pass switch 330 is connected in parallel with the upper switching module 350 and not the lower switching module 340.

In any case, referring to either one of the embodiments shown in FIG. 1 or 3, the by-pass switch is connected in parallel with the switching module not being split.

The basic of the operation principle is the same as for the converter module 100 described with reference to FIG. 1. In general, in case of failure of a switching device of the splitted switching module, only the capacitor unit dedicated to the failed switching device will discharge its energy via the by-pass switch.

In this embodiment, the second switching module 350 is connected at the first node 380 to the collectors of the switching devices 342, 344 of the first switching module 340.

Figure 4:
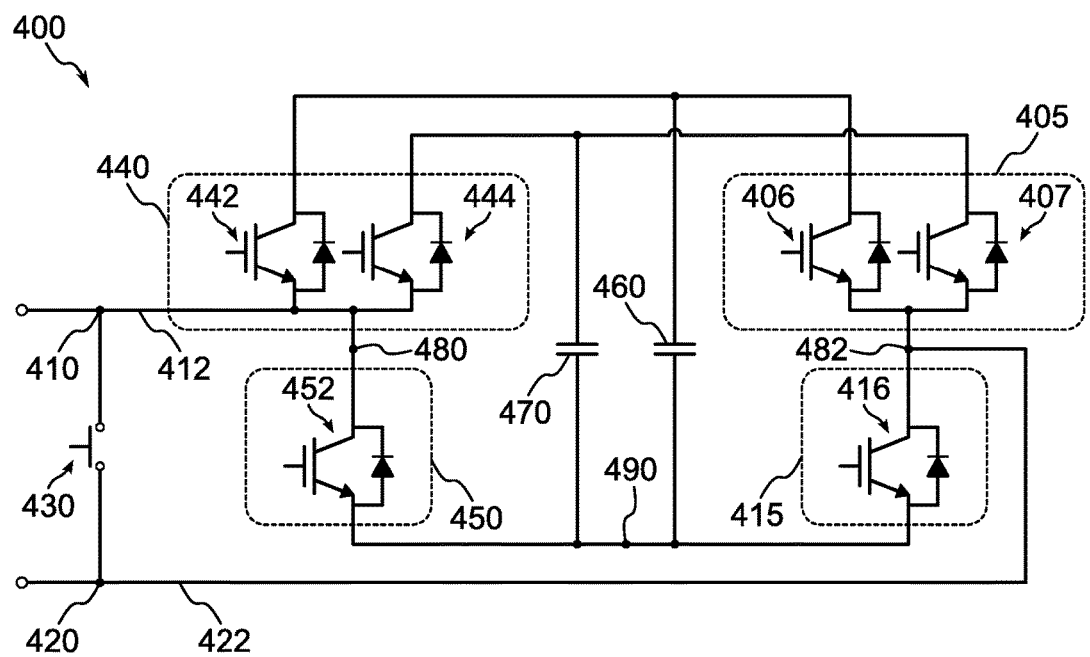
FIG. 4 shows a circuit diagram of a converter module according to one embodiment based on a full-bridge topology.

With reference to FIG. 4, a power converter module (or converter cell) according to another embodiment based on a full bridge topology is described.

In this embodiment, the power converter module 400 includes a first switching module 440, a second switching module 450 and two capacitor units 460, 470 connected as described with reference to FIG. 1 (see first switching module 110, second switching module 120 and two capacitor units 160, 170). Similarly, the first node 180, the second node 190, the first switching device 142, the second switching device 144, the first terminal 110, the first connection line 112, the second terminal 120 and the second connection line 122 of the embodiment described with reference to FIG. 1 corresponds to the first node 480, the second node 490, the first switching device 442, the second switching device 444, the first terminal 410, the first connection line 412, the second terminal 420 and the second connection line 422 of the converter module 400 shown in FIG. 4.

In addition, the converter module 400 includes a third switching module 405 and a fourth switching module 415 connected in series via a third node 482. The third switching module 405 includes at least two switching devices 406, 407 and the fourth switching module 415 is connected between the second node 490 and the third node 482. A first switching device 406 of the third switching module 405 is connected to the second node 490 via the first capacitor unit 460 and a second switching device 407 of the third switching module 405 is connected to the second node via the second capacitor unit 479 to form two separate current paths between the third node 482 and the second node 490.

In this configuration, the by-pass switch 430 is connected between the first node 480 and the third node 482.

It will be appreciated that the full-bridge configuration corresponds to the juxtaposition of two sets of two switching modules sharing the same energy storage and in particular the same capacitor units 460, 470. The electrical configuration is symmetric and the two switching modules 405 and 415 are connected in a similar manner as the two switching modules 440 and 450.

All possible variations of the connections (arrangements) described above for the switching modules 440 and 450 with reference to FIGS. 1-3 apply here for the switching modules 405 and 415 including e.g. the type of switching devices.

For example, it will be appreciated that the third switching module 405 may not only include two switching devices but a plurality of switching devices (or transistors) or groups of switching devices.

Similarly, the converter module shown in FIG. 4 may be based on a connection of the collectors of the transistors of the first and third switching module to the transistor of the second and fourth switching modules, respectively, instead of a connection of their emitters.

Figure 5:
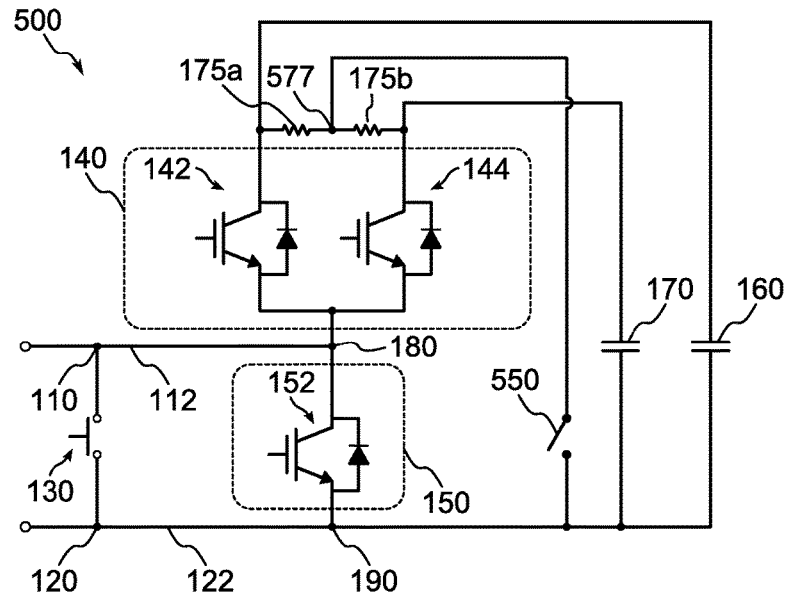
FIG. 5 shows a circuit diagram of a converter module according to another embodiment based on half-bridge topology.

With reference to FIG. 5, a power converter module (or converter cell) according to yet another embodiment is described.

FIG. 5 shows a circuit diagram illustrating the electrical arrangement of elements of a converter module 500 based on a half-bridge cell topology.

The converter module 500 shown in FIG. 5 is equivalent to the converter module 100 described with reference to FIG. 1 except that the resistor (or resistive component) connecting the first electrical current path to the second electrical current path includes two separate resistor elements 175a and 175b.

FIG. 5 shows that the two separate resistor elements (or resistive elements) 175a and 175b may be connected in series at a node 577 connected to the second node 190 through a switch 550, such as e.g. a semiconductor switch or a mechanical switch.

Further, the present disclosure relates also to a device comprising a control circuit and at least one converter module as defined in any one of the preceding embodiments.

Figure 6:
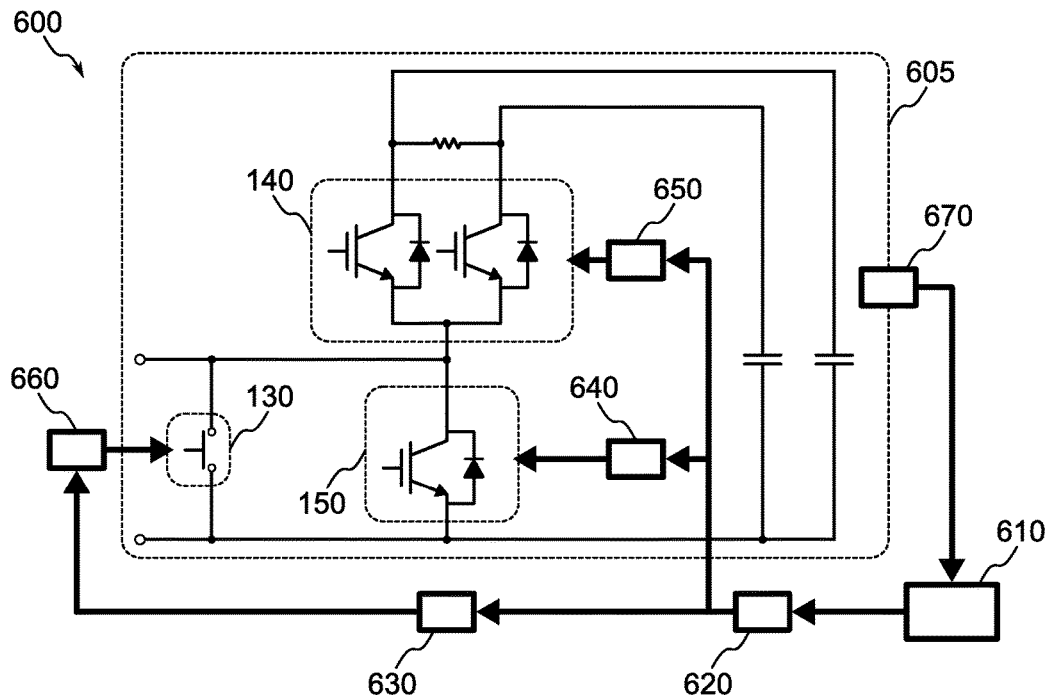
FIG. 6 shows a circuit diagram of a device including a control circuit and at least one converter module.

FIG. 6 shows an embodiment of such a device 600.

The device 600 includes a converter module 605 which may be equivalent to any one of the converter modules described in the above embodiments. By way of example, the converter module shown in FIG. 6 corresponds to the converter module 100 described with reference to FIG. 1.

The device includes a control circuit with a controller 610, a triggering unit 620, a delay unit 630, a by-pass trigger 660 and gate units 640 and 650.

Upon detection of a failure at the converter module and in particular at any one of the switching devices of the first switching module or the third switching module of the converter module, and/or upon detection of a failure at any of the second switching module or the fourth switching module of the converter module (or even at one of the capacitor units), as may be detected via a sensor or sensing system 670, the control circuit via the controller 610 generates a signal instructing the switching devices and the switching modules of the converter module to turn off.

For example, the gates of the switching devices of the first switching module may be connected to a common control line which may receive a control signal to deactivate the switching devices (the transistors) upon detection of a failure.

In some other embodiments, the gates of the switching devices of the switching modules may be connected to separate control lines such that the control unit is configured to send separate control signals to the switching devices via the separate control lines.

In FIG. 6, two gate units 640 and 650 connected to the controller 610 are configured to deactivate (turn off) the first switching module and the second switching module, respectively, of the converter module 605 upon reception of a signal from the controller 610 via the triggering unit 620.

In general, the control circuit via the controller 610 and the triggering unit 620 may be configured to synchronize activation and deactivation of the switching devices of the converter module. Further, the control circuit may be configured to instruct the by-pass switch to conduct current upon detection of a failure. In particular, the control circuit via the controller 610 may be configured to trigger the by-pass switch after a delay has elapsed since transmission of instructions to turn off the switching devices of the converter module. For this purpose, the control circuit may be equipped with a delay unit 630 to delay the triggering signal transmitted to the by-pass trigger unit 660 connected to the by-pass switch of the converter module for activation.

For example, before sending a triggering signal to the by-pass switch, the control unit may be configured to force to turn off all the transistors connected in parallel such that, in case one of the transistors is in short circuit failure, the other transistors are turned off. Then, after the by-pass switch is triggered, only one of the capacitor units will be discharged through the failed IGBT and the by-pass switch. The other capacitor unit will experience a very slow discharge through its internal resistor.

Further, it will be appreciated that, when the switching modules are turned on, the capacitor units will experience approximately the same voltage level during their charge/discharge process. Using capacitances of approximately the same value for the capacitor units (with a difference in the range of about 5-10%), the amount of charge/discharge will also be similar and the current though the switching modules will be balanced (with about 5-10% difference).

Figure 7:
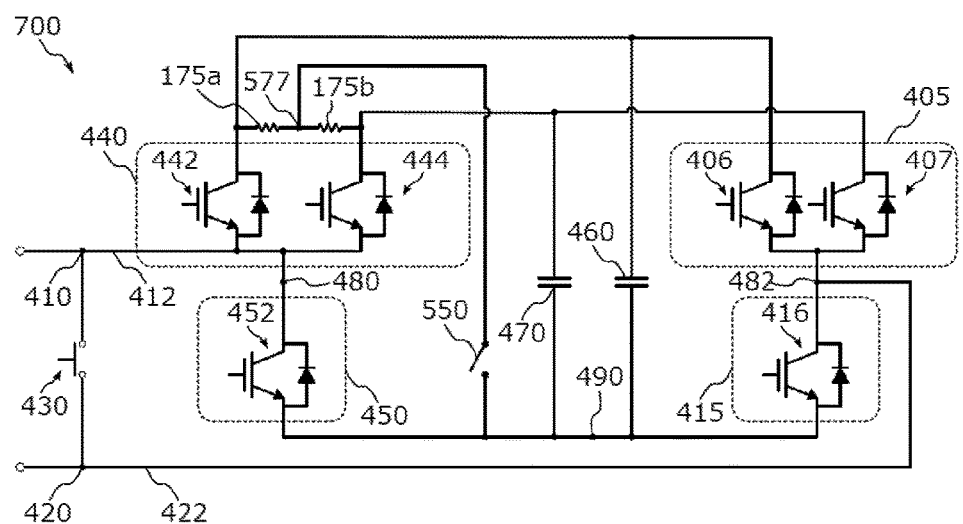
FIG. 7 shows a circuit diagram of a converter module according to another embodiment.

With reference to FIG. 7, a power converter module (or converter cell) according to yet another embodiment is described. FIG. 7 shows a circuit diagram illustrating the electrical arrangement of elements of a converter module 700. The converter module 700 shown in FIG. 7 is similar to the converter module 400 described with reference to FIG. 4 except that the resistor (or resistive component) connecting the first electrical current path to the second electrical current path includes two separate resistor elements 175a and 175b, and the two separate resistor elements (or resistive elements) 175a and 175b may be connected in series at a node 577 connected to the second node 190 through a switch 550, such as e.g. a semiconductor switch or a mechanical switch, as illustrated in the embodiment shown in FIG. 5.

The present disclosure also relates to a valve unit or, more generally, a power converter station comprising a plurality of converter modules or devices as defined in any one of the preceding embodiments. The plurality of converter modules may be connected in series and arranged as at least one column.

In summary, converter modules based on either half bridge topology or full bridge topology are provided.

According to one aspect, the converter module may include a first switching module and a second switching module. The first switching module includes at least two switching devices connected in parallel and the second switching module is connected from a first node to a second node. The second switching module is connected in series with the first switching module via the first node. Further, the converter module includes at least two capacitor units dedicated to each one of the at least two switching devices of the first switching module such that a first capacitor unit is separately connected from the first node to a first switching device of the first switching module and a second capacitor unit is separately connected from the first node to a second switching device of the first switching module. Further, the first node may be connected to a first connection line and the second node may be connected to a second connection line. In the converter module, a by-pass switch is connected in parallel with the second switching module between the first connection line and the second connection line.

According to another aspect, the converter module comprises a first switching module and a second switching module. The first switching module includes at least two switching devices connected in parallel and the second switching module is connected from a first node to a second node. The second switching module may be connected in series with the first switching module via the first node. Further, the converter module includes at least two capacitor units separately connected to the two switching devices of the first switching module such that a first capacitor unit is connected from the second node to a first switching device of the first switching module and a second capacitor unit is connected from the second node to a second switching device of the first switching module. In the present configuration, the converter module further includes a third switching module including at least two switching devices connected in parallel and a fourth switching module connected between the second node and a third node. The fourth switching module is connected in series with the third switching module via the third node, wherein a first switching device of the third switching module is connected to the second node via the first capacitor unit and a second switching device of the third switching module is connected to the second node via the second capacitor unit. The first node is connected to a first connection line while the third node is connected to a second connection line. The converter module includes a by-pass switch connected between the first node and the third node (i.e. between the two connection lines).

In the context of the present disclosure, the term valve unit may be interchangeably replaced with the terms converter valve stack, block unit or apparatus (of a power converter).

The designs according to the above described embodiments are applicable for Modular Multilevel Converter (MMC) based HVDC Light technology.

The embodiments of the present disclosure are advantageous in any applications wherein constraints on a by-pass switch are to be alleviated or wherein it is required to reduce the amount of energy released in case of failure of one or more transistors of a converter module.

The embodiments of the present disclosure are therefore particularly advantageous for applications in which a more compact power equipment is desired in order to reduce the stress from energy release during converter module failure. An example may be electric power equipments for offshore wind farm applications.

The present disclosure is applicable for power equipments with various voltage levels such as e.g. a high voltage power converter station but also medium voltage equipments.

For exemplifying purposes only, embodiments of the present disclosure may be beneficial to achieve converters such as a static synchronous compensator (STATCOM) for flexible AC transmission systems (FACTS) applications, motor drives, sub-sea power converters and DC-DC converters for DC grid. Other applications may however be envisaged.

Although features and elements are described above in particular combinations, each feature or element can be used alone without the other features and elements or in various combinations with or without other features and elements. In particular, although the examples shown in FIGS. 4 and 6 include five valve units, it will be appreciated that any other number of valve units may be used to form a power converter station (or at least part of it). Further, reference to a first, second, third, fourth and fifth valve units may be interchanged such as for instance the third valve unit is considered to be the first valve unit and vice versa.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A converter module comprising:
 a first terminal for input/output of an electrical current to the converter module via a first connection line,
 a second terminal for output/input of the current from the converter module via a second connection line,
 a by-pass switch connected between the first terminal and the second terminal,
 a first switching module and a second switching module connected in series via a first node connected to either one of the first terminal and the second terminal, wherein at least the first switching module includes two switching devices and wherein the second switching module is connected between the first node and a second node,
 at least two capacitor units, wherein a first capacitor unit is connected from the second node to a first switching device of the first switching module and a second capacitor unit is connected from the second node to a second switching device of the first switching module to form two separate current paths between the first node and the second node, and
 at least one resistive component, wherein a first current path connecting the first capacitor unit to the first switching device of the first switching module is connected via said at least one resistive component to a second current path connecting the second capacitor unit to the second switching device of the first switching module, wherein said at least one resistive component includes at least two separate resistor elements connected in series at a node connected to the second node through at least a semiconductor switch or a mechanical switch.

2. The converter module of claim 1, wherein the first switching module includes a plurality of switching devices and the converter module comprises a plurality of capacitor units, wherein each of the capacitor units is separately connected to a corresponding one of the switching devices of the first switching module.

3. The converter module of claim 2, wherein a switching device of the first switching module includes a transistor having an emitter, a gate and a collector.

4. The converter module of claim 2, wherein the second switching module includes one or more switching device.

5. The converter module of claim 1, wherein a switching device of the first switching module includes a transistor having an emitter, a gate and a collector.

6. The converter module of claim 5, wherein the second switching module is connected at the first node to either the emitters or the collectors of the switching devices of the first switching module.

7. The converter module of claim 6, wherein the gates of the switching devices of the first switching module are connected to a common control line or to separate control lines.

8. The converter module of claim 6, wherein the second switching module includes one or more switching device.

9. The converter module of claim 5, wherein the gates of the switching devices of the first switching module are connected to a common control line or to separate control lines.

10. The converter module of claim 5, wherein the second switching module includes one or more switching device.

11. The converter module of claim 1, wherein the second switching module includes one or more switching device.

12. The converter module of claim 1, wherein a switching device of the first switching module or a switching device of the second switching module is one of an insulated-gate bipolar transistor (IGBT), a bi-mode insulated gate transistor (BIGT), a metal-oxidesemiconductor field-effect transistor (MOSFET), an integrated gate-commutated thyristor (IGCT), a gate turn-off thyristor (GTO), a high electron mobility transistor (HEMT) and a hetero junction bipolar transistor (HBT).

13. The converter module of claim 1, wherein the by-pass switch is connected in parallel with the second switching module between the first node and the second node.

14. The converter module of claim 1, further comprising a third switching module and a fourth switching module connected in series via a third node, wherein the third switching module includes at least two switching devices and wherein the fourth switching module is connected between the second node and the third node, wherein a first switching device of the third switching module is connected to the second node via the first capacitor unit and a second switching device of the third switching module is connected to the second node via the second capacitor to form two separate current paths between the third node and the second node.

15. The converter module of claim 14, wherein the by-pass switch is connected between the first node and the third node.

16. A device comprising a control circuit and at least one converter module as defined in claim 1, wherein the control circuit is configured to trigger the by-pass switch of said converter module and to generate a signal instructing the switching devices and the switching modules of said at least one converter module to turn off.

17. The device of claim 16, wherein the at least one converter module further comprises a third switching module and a fourth switching module connected in series via a third node, and the control circuit is configured to instruct the by-pass switch to conduct current and the switching devices and switching modules to turn off upon detection of a failure at any one of the switching devices of the first switching module or the third switching module of said at least one converter module and/or upon detection of a failure at any of the second switching module or the fourth switching module of said at least one converter module.

18. The device of claim 16, wherein the control circuit is configured to trigger the by-pass switch after a delay has elapsed since transmission of instructions to turn off the switching devices of the converter module.

19. The device of claim 16, wherein the control circuit is configured to synchronize activation and deactivation of the switching devices of the converter module.

20. A power converter station comprising a plurality of converter modules or devices as defined in claim 1, said plurality of converter modules being connected in series and arranged as at least one column.

\* \* \* \* \*